United States Patent
Yang et al.

(10) Patent No.: US 10,598,544 B2
(45) Date of Patent: Mar. 24, 2020

(54) LOW CROSSTALK, COMMON PATH, DUAL RING SAGNAC INTERFEROMETER FOR DISTURBANCE SENSING

(71) Applicant: Luxpoint, Inc., Rocky Hill, CT (US)

(72) Inventors: Yi Yang, Mansfield Storrs, CT (US); Trevor MacDougall, South Dartmouth, MA (US)

(*) Notice: Subject to any disclaimer, the term of this patent is extended or adjusted under 35 U.S.C. 154(b) by 0 days.

(21) Appl. No.: 16/304,395

(22) PCT Filed: Jul. 27, 2018

(86) PCT No.: PCT/US2018/044034
§ 371 (c)(1),
(2) Date: Nov. 26, 2018

(87) PCT Pub. No.: WO2020/023054
PCT Pub. Date: Jan. 30, 2020

(65) Prior Publication Data
US 2020/0033186 A1    Jan. 30, 2020

(51) Int. Cl.
| | |
|---|---|
| *G01H 9/00* | (2006.01) |
| *G01D 5/353* | (2006.01) |
| *G02B 6/293* | (2006.01) |
| *H04B 10/2587* | (2013.01) |

(52) U.S. Cl.
CPC ......... *G01H 9/004* (2013.01); *G01D 5/35303* (2013.01); *G01H 9/006* (2013.01); *G02B 6/29355* (2013.01); *H04B 10/2587* (2013.01)

(58) Field of Classification Search
CPC .... G01H 9/004; G01H 9/006; G01D 5/35303; G01D 5/35325; G01D 5/35329; G02B 6/29355; G01C 19/72; G01B 9/02; G01B 11/14; G01B 11/16; G01J 9/02; G01J 9/04; G01N 30/74; G01S 17/02; G11B 7/13; H04B 10/2587
USPC ........................................... 73/655, 643, 657
See application file for complete search history.

(56) References Cited

U.S. PATENT DOCUMENTS

| | | |
|---|---|---|
| 5,675,674 A | 10/1997 | Weis |
| 5,978,114 A | 11/1999 | Clark |
| 6,678,211 B2 | 1/2004 | Vakoc |
| 7,130,506 B2 | 10/2006 | Shaibani |
| 2001/0055438 A1* | 12/2001 | Tweedy ................. G01B 11/16 385/12 |
| 2002/0097636 A1* | 7/2002 | Vakoc ...................... G01S 3/80 367/149 |
| 2017/0160315 A1* | 6/2017 | Muller ................ G01R 15/246 |

* cited by examiner

*Primary Examiner* — Lisa M Caputo
*Assistant Examiner* — Rose M Miller
(74) *Attorney, Agent, or Firm* — Matthew J Patterson

(57) ABSTRACT

Embodiments of the present disclosure include a low crosstalk, optical fiber based disturbance detection system that includes single-mode optical fiber (SMF) arranged into dual ring Sagnac interferometer wherein both rings share a common sensing section of optical fiber path length. Certain embodiments further include fiber Bragg gratings (FBG's), circulators and couplers to be able to separate the optical signals of the two rings of the dual ring Sagnac interferometer and to perform processing of their individual signals. Embodiments are also disclosed that enable the position of a physical disturbance, the magnitude of the physical disturbance and the frequency of the physical disturbance to be known.

5 Claims, 4 Drawing Sheets

LOW CROSSTALK, COMMON PATH, DUAL RING SAGNAC INTERFEROMETER FOR DISTURBANCE SENSING

CROSS-REFERENCE TO RELATED APPLICATIONS

This application claims priority under 35 U.S.C. § 371 to PCT Application No. PCT/US2018/044034 filed 27 Jul. 2018.

BACKGROUND OF THE DISCLOSURE

Field of the Disclosure

The present disclosure relates to optical sensing systems, and more particularly to fiber optic sensing systems for event detection systems and for measuring disturbances.

Description of the Related Art

Optical sensing devices have been used in the art for physical intrusion detection systems (PIDS), pipeline detection, seismic detection, acoustic detection and the like. The various techniques employed can be broken into three broad categories and include interferometry, scattering and fiber Bragg grating (FBG) as well as combinations thereof. An important aspect of such detection systems is spatial resolution or the ability to accurately locate the position of the disturbance, sometimes referred to as the point of detection (POD). Other important aspects include where the systems can be mounted, the false alarm rate (FAR), the complexity of the interrogation technique, the cost of the system, the distances the system can cover, and the ability to sense disturbances over the entire length of the system (distributed as opposed to discrete point sensing). Yet another important aspect of such systems is the ability to distinguish between different types of disturbances in magnitude, nature and temporal positioning. Some prior art disturbance sensing systems include those disclosed in U.S. Pat. Nos. 5,194,847, 6,937,151, 7,173,690, 7,175,790, 8,705,020, 8,873,064, 8,875,164 and 9,557,441.

It is known that interferometric techniques are especially useful for distributed sensing. Such techniques include optical domain reflectometry (OTDR), Mach-Zehnder, Michaelson, Fabry-Perot, Sagnac ring interferometer (SRI) and coherent optical time domain reflectometry (COTDR). Referring to FIG. 1a, there is shown a Mach-Zehnder sensing system 1 typical of the prior art that includes a source 2, a first optical coupler 3, a reference leg 4, a second optical coupler 5, a detector 6 and a sensing leg 7. FIG. 1b shows an SRI sensing system 10 typical of the prior art that includes a source 2, an optical coupler 3, a detector 6 and a loop 8. FIG. 1c shows a Michelson sensing system 11 typical of the prior art that includes a source 2, an optical coupler 3, a detector 6, a reference leg 9, a first mirror 12, a sensing leg 13 and a second mirror 14. FIG. 1d shows a Fabry-Perot sensing system 15 typical of the prior art that includes a source 2, an optical coupler 3, a detector 6, a first mirror 12, a second mirror 14 and a sensing region 16.

Referring now to FIG. 1b, in a typical SRI 10 of the prior art the loop 8 having a total length of L comprises a common optical path in which light from source 2 is split at optical coupler 3 and the light travels the optical path in opposite directions. Half of the light travels in the clockwise direction 20 and half travels in the counter-clockwise direction 21 and they are recombined at optical coupler 3 and can present as an interference pattern on detector 6. In such a system used for intrusion detection, a coil 22 of fiber can be positioned near the geometrical center of loop 8 to allow a physical disturbance to be sensed near this position as will be described in more detail herein after. A physical disturbance (thermal, mechanical, etc) will cause a perturbation in the core of the fiber resulting in a phase change $\Delta\theta_s$ in the counterpropagating light beams.

Problems with such prior art interferometric based disturbance sensing systems include that they typically have a high cost, the interrogation techniques are relatively complex and they have low spatial resolution. It is therefore desirable to provide a distributed disturbance detection system having a high spatial resolution, low false alarm rate, simple interrogation technique, low cost, long operating distance, and the ability to distinguish between different types of disturbances.

SUMMARY OF THE DISCLOSURE

In accordance with some aspects of the present disclosure, systems and methods related to a distributed disturbance sensing system are disclosed. In certain embodiments a dual Sagnac ring interferometric system for sensing a physical disturbance is disclosed.

It is an aspect of the present disclosure that the system includes a light source that produces a source light and a first interferometer coupled to the light source having a first optical path length that is comprised of a sensing arm and a first reflector that produces a first reflected light. The system further includes a second interferometer coupled to the light source having a second optical path length that is comprised of the same sensing arm and a second reflector that produces a second reflected light. The system further includes a detector coupled to the first interferometer and the second interferometer to detect a first phase shift in the first reflected light and to detect a second phase shift in the second reflected light.

In another aspect of the present disclosure, the sensing arm is an optical fiber having a sensing optical path that can sense the physical disturbance at a position along the sensing optical path and the physical disturbance produces the first phase shift and the second phase shift.

In another aspect of the present disclosure, the source light and the first reflected light travel in a first direction and a second direction along the first optical path length and the source light and the second reflected light travel in a third direction and a fourth direction along second optical path length.

In still another aspect of the present disclosure, the first phase shift is a difference between a phase of the first reflected light travelling in the first direction and a phase of the first reflected light travelling in the second direction and the second phase shift is a difference between a phase of the second reflected light travelling in the third direction and a phase of the second reflected light travelling in the fourth direction along second optical path length.

In yet another aspect of the present disclosure, the system includes a processor with logic to determine a parameter of the physical disturbance from the first phase shift and the second phase shift where the parameter can be the position of the physical disturbance and a magnitude of the physical disturbance and a frequency of the physical disturbance.

It is also an aspect of the present disclosure to provide a method for sensing a physical disturbance that includes producing a source light and launching the source light into a first interferometer having a first optical path length comprising a sensing arm and a first reflector and producing a first reflected light from the first reflector and launching the source light into a second interferometer having a second optical path length comprising the sensing arm and a second reflector and producing a second reflected light from the second reflector and detecting a first phase shift in the first reflected light from the first interferometer; and detecting a second phase shift in the second reflected light from the first interferometer.

In another aspect of the present disclosure, the method includes exposing a sensing optical path of the sensing arm to sense the physical disturbance at a position along the sensing optical path and the physical disturbance produces the first phase shift and the second phase shift. Using the first phase shift and the second phase shift and a parameter of the physical disturbance is determined that includes the position of the physical disturbance, a magnitude of the physical disturbance and a frequency of the physical disturbance.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

DETAILED DESCRIPTION

In the following detailed description of the embodiments, reference is made to the accompanying drawings, which form a part hereof, and within which are shown by way of illustration specific embodiments by which the examples described herein may be practiced. It is to be understood that other embodiments may be utilized and structural changes may be made without departing from the scope of the disclosure. Embodiments of the present disclosure address the many issues raised hereinbefore using a novel systematic optical apparatus and methods. The various component parts and methods of embodiments presented herein can be used in alone or in countless combinations while remaining within the scope of the disclosure.

Embodiments of the present disclosure include an optical fiber based disturbance detection system that includes single-mode optical fiber (SMF) arranged into a pair of SRI that share a common section of optical fiber path length. More specifically, embodiments of the present disclosure provide a low crosstalk, dual ring Sagnac interferometer, wherein the dual rings share a common sensing optical path length for sensing a disturbance. Certain embodiments further include fiber Bragg gratings (FBG's), circulators and couplers to be able to separate the optical signals of the two loops of the SRIs and to perform processing of their individual signals. As will be described in more detail herein after, the disturbance detection system of the present disclosure can be used as a detection system for physical disturbances, PIDS, pipeline leak detection, seismic detection, and acoustic detection among other uses. Further, embodiments of the present disclosure include a sensing fiber, which can be deployed over several kilometers and electronic instrumentation located either at one end or both ends of the fiber string.

Figure 2:
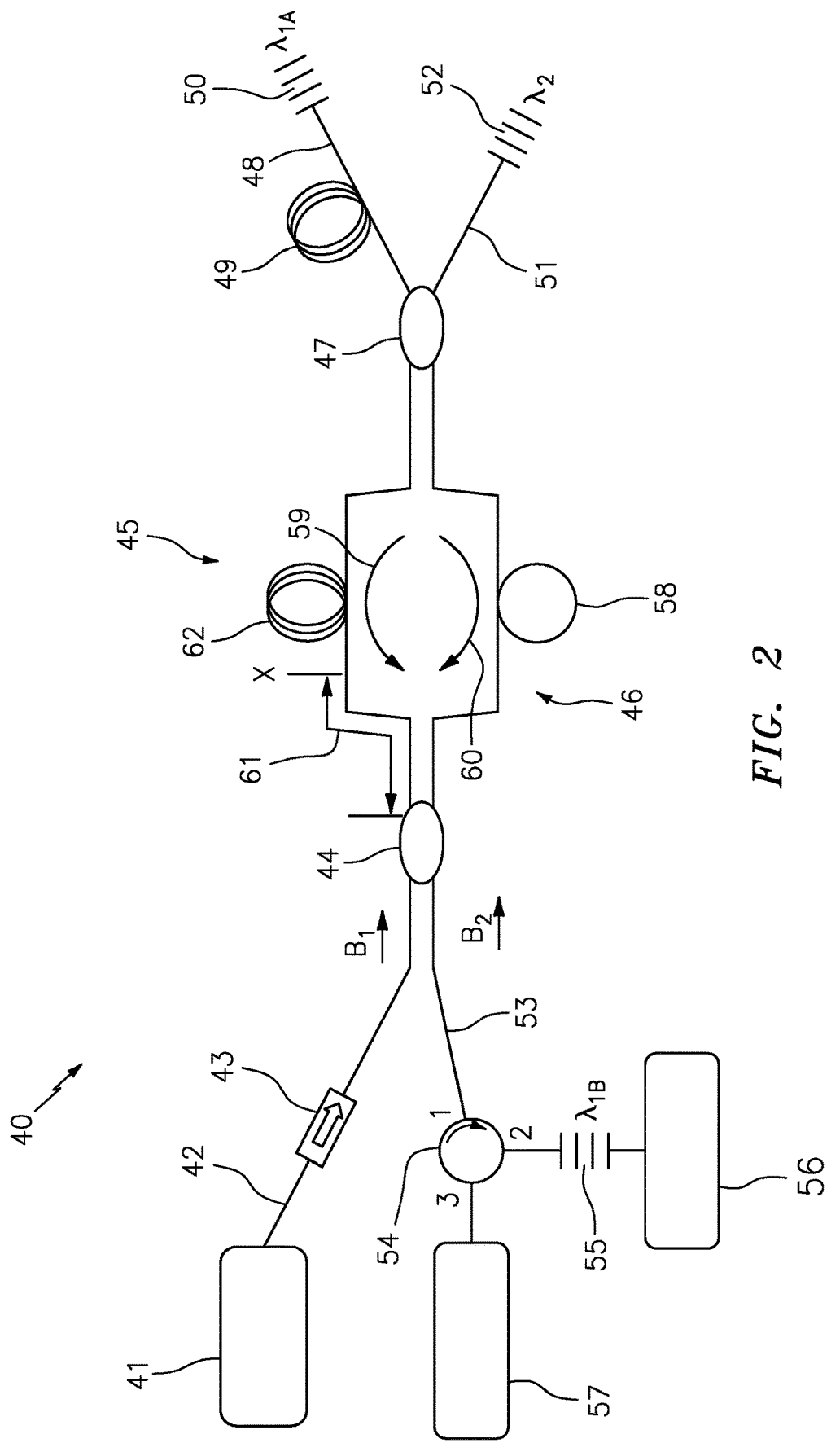
FIG. 2 is a schematic representation of a double Sagnac ring interferometric sensing system in accordance with certain embodiments of the present disclosure.

Referring now to FIG. 2, there is shown a disturbance detection system 40 of the current disclosure that includes a light source 41, a launching fiber 42 having an optical isolator 43 positioned thereon, a first optical coupler 44, a sensing arm 45, a non-sensing arm 46, a second optical coupler 47, a first signal arm 48 having a first signal FBG 50 positioned therein and a second signal arm 51 having a second signal FBG 52 positioned therein. Disturbance detection system 40 further includes signal arrival arm 53, an optical circulator 54, a reflecting filter 55, a first detector 56 and a second detector 57.

In the embodiment shown in FIG. 2, launching fiber 42, sensing arm 45, first signal arm 48, second signal arm 51, non-sensing arm 46 and signal arrival arm 53 are sensibly comprised of SMF known in the art. In addition, sensing arm 45 can comprise a bare fiber, a fiber having a special coating, a fiber disposed within protective materials and articles, such as armored cabling, and other compositions without departing from the present disclosure. Light source 41 produces a source light and is preferably a low coherence source and can comprise a super luminescent diode (SLD) or another type of low coherence source, for example, a light emitting diode (LED), fiber amplified spontaneous emission (ASE) or a white light source. Light source 41 of the present disclosure preferably has a wide bandwidth that can efficiently inject light into an SMF. Optical isolator 43, which can comprise an optical diode, allows the launching of light from light source 41 along launching fiber 42 solely in the direction of optical coupler 44 to prevent unwanted feedback into the optical source. Optical couplers 44, 47 can comprise single mode 2×2 optical couplers such as those available from the Newport Corporation adapted to couple light into and out of the various fibers of disturbance detection system 40. Optical circulator 54 is shown as a three port single mode circulator known in the art and having ports 1, 2 and 3. First signal arm 48 has a signal arm length which includes delay coil 49 and FBG 50, which is a typical Bragg reflector constructed by known methods in the fiber of first signal arm 48 to reflect a beam of light having a first characteristic wavelength $\lambda_{1A}$ and which can be a characteristic wavelength of 1545 nm. Second signal arm 51 has a shorter signal arm length relative to that of first signal arm 48 and includes FBG 52 which is constructed to reflect a beam of light having a second characteristic wavelength $\lambda_2$ and which wavelength can be a characteristic wavelength of 1552 nm. These first and second reflected wavelengths are used as examples in this disclosure but could be of any wavelength contained in the spectrum of light source 41 and able to be detected and distinguished (from each other) by detectors 56, 57 as will be described in more detail herein after. Only light at wavelengths $\lambda_{1A}$ and $\lambda_2$ will be reflected back to coupler 47 as will be described in more detail herein after. Reflecting filter 55 is shown as an FBG coupled to optical circulator 54 and detector 56 and is constructed to reflect light at a third characteristic wavelength $\lambda_{1B}$ to optical circulator 54. Detector 56 is of any known type of detector capable of absorbing light at least at wavelength $\lambda_2$ and converting it to an electrical signal. Similarly, detector 57 is of any known type of detector capable of absorbing light at least at wavelength $\lambda_{1B}$ and converting it into electrical signals.

Still referring to FIG. 2, it is important to note that the optical path that includes sensing arm 45, first signal arm 48, and non-sensing arm 46 comprises a first Sagnac ring interferometer ($SRI_A$) having a total optical path length $L_A$. Further, the optical path that includes sensing arm 45, second signal arm 51, and non-sensing arm 46 comprises a second Sagnac ring interferometer ($SRI_B$) having a total optical path length $L_B$. Sensing arm 45 has an optical path sensing length $L_S$ that is positioned between optical couplers 44, 47 and is exposed to the environment to be sensed. The sensing optical path length of sensing arm 45 can be a few meters and up to tens of kilometers and it is depicted as having a long length of fiber 62. It is an important aspect of this particular embodiment that $SRI_A$ and $SRI_B$ inventively share the same optical path of sensing arm 45. First signal arm 48 is isolated from disturbances and has an optical path length that includes delay coil 49 which length can be two or more kilometers. Second signal arm 51 is also isolated from disturbances and has an optical path length that can include a delay coil (not shown) but which length is substantially shorter than that of first signal arm 48 and can be one kilometer or less. $SRI_A$ and $SRI_B$ can also share the optical path of non-sensing arm 46 which is also isolated from disturbances wherein the path length can also include a coil 58. In this particular embodiment, the relationship between the various optical path lengths are such that $L_A \neq L_B$, $L_A - L_S > L_S$ and $L_B - L_S > L_S$.

Figure 3:
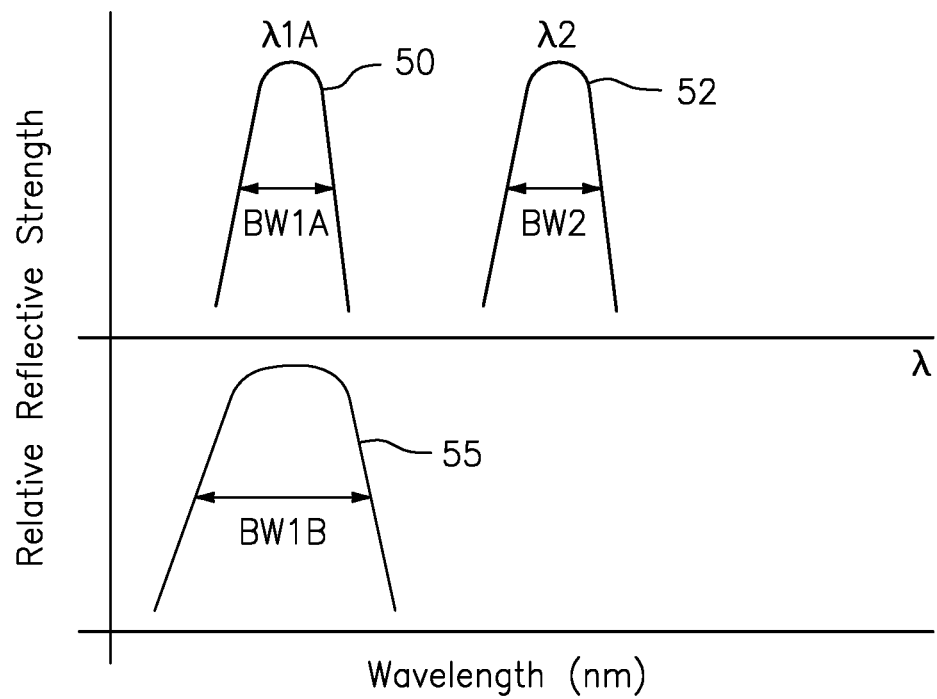
FIG. 3 is a graphical representation of FBG characteristics in accordance with certain embodiments of the present disclosure.

In the embodiment shown in FIG. 2, and with reference to FIG. 3, FBGs 50, 52 and 55 are selected to minimize any spectral overlap between the FBGs and to reduce any crosstalk between the two Sagnac ring interferometers $SRI_A$ and $SRI_B$. Specifically, FBGs 50, 52 and 55 are comprised of high reflectivity Bragg gratings, and can be on the order of 99% reflectivity for the preselected center wavelength, in order to provide largest optical power to the detectors 56, 57 to maximize the signal-to-noise ratio (SNR). Also shown in FIG. 3, the third characteristic wavelength $\lambda_{1B}$ of FBG 55 and the first characteristic wavelength $\lambda_{1A}$ of FBG 50 are centered about the same wavelength but the bandwidth of FBG 55 is greater than the bandwidth of FBG 50 to reduce crosstalk and ensure capture of the entire reflected signal of FBG 50 as will be described in more detail below. The bandwidths of FBGs 50, 52 and 55 should be as large as possible without overlap of FBGs 50 and 55 with FBG 52 with a typical spacing of about 5 nm. In this particular embodiment disturbance detection system 40 exhibits a channel isolation greater than about 25 dB between $SRI_A$ and $SRI_B$.

The operation of disturbance detection system 40 comprising a dual Sagnac ring interferometric system is best described with reference to FIG. 2. It is known by those skilled in the art of interferometry that only counterpropagating light that follows a common path are useful in determining changes in that path by investigating the modulation of the combined signals. As such, tracing the light paths of $SRI_A$ and $SRI_B$, the paths of which are described herein above, will now be disclosed. As a non-limiting example, when no disturbance is present, the low coherence light emitted from light source 41 is split into a first beam $B_1$ and a second beam $B_2$ at coupler 44 and the first beam $B_1$ follows sensing arm 45 in the clockwise direction 60 and the second beam $B_2$ follows non-sensing arm 46 in the counter-clockwise direction 59. With respect to $SRI_A$, after being split in optical coupler 47, a first portion of the first beam $B_1$ traverses the light path of $SRI_A$ in the clockwise direction 60 by entering first signal arm 48 as broadband light, encounters FBG 50 and the beam having the first characteristic wavelength $\lambda_{1A}$ is reflected back along first signal arm 48, through delay coil 49. The beam continues to traverse the path of $SRI_A$ in the clockwise direction 60 along non-sensing arm 46 to optical coupler 44. After being split in optical coupler 47, a first portion of the second beam $B_2$ traverses the light path of $SRI_A$ in the counter-clockwise direction 59 by entering first signal arm 48 as broadband light, encounters FBG 50 and the beam having the first characteristic wavelength $\lambda_{1A}$ is reflected back along first signal arm 48, through delay coil 49. The beam continues to traverse the path of $SRI_A$ in the counter-clockwise direction 59 along sensing arm 45 to optical coupler 44. In this example, when the two counterpropagating beams are combined at optical coupler 44 they remain in phase with each other because there is no disturbance present along sensing arm 45 although there can be a dc offset between the two signals due to birefringence in coiled fibers. The combined beams having the first characteristic wavelength $\lambda_{1A}$ enter port 1 of optical circulator 54 exit port 2 of the optical circulator and all of the light that is within third characteristic wavelength $\lambda_{1B}$ is reflected back to port 2, exits port 3 and becomes incident on detector 57. With respect to $SRI_B$, after being split in optical coupler 47, a second portion of the first beam $B_1$ traverses the light path of $SRI_B$ in the clockwise direction 60 by entering signal arm 51 as broadband light, encounters FBG 52 and the beam having the second characteristic wavelength $\lambda_B$ is reflected back along signal arm 51. The beam continues to traverse the path of $SRI_B$ in the clockwise direction 60 along non-sensing arm 46 to optical coupler 44. After being split in optical coupler 47, a second portion of the second beam $B_2$ traverses the light path of $SRI_B$ in the counter-clockwise direction 59 by entering signal arm 51 as broadband light, encounters FBG 52 and the beam having the second characteristic wavelength $\lambda_B$ is reflected back along signal arm 51. The beam continues to traverse the path of $SRI_B$ in the counter-clockwise direction 59 along sensing arm 45 to optical coupler 44. In this example, when the two counterpropagating beams are combined at optical coupler 44 they remain in phase with each other because there is no disturbance present along sensing arm 45. The combined beams having the first characteristic wavelength $\lambda_B$ enter port 1 of optical circulator 54 exit port 2 of the optical circulator and all of the light that is outside of third characteristic wavelength $\lambda_{1B}$ becomes incident on detector 56.

Figure 1A:
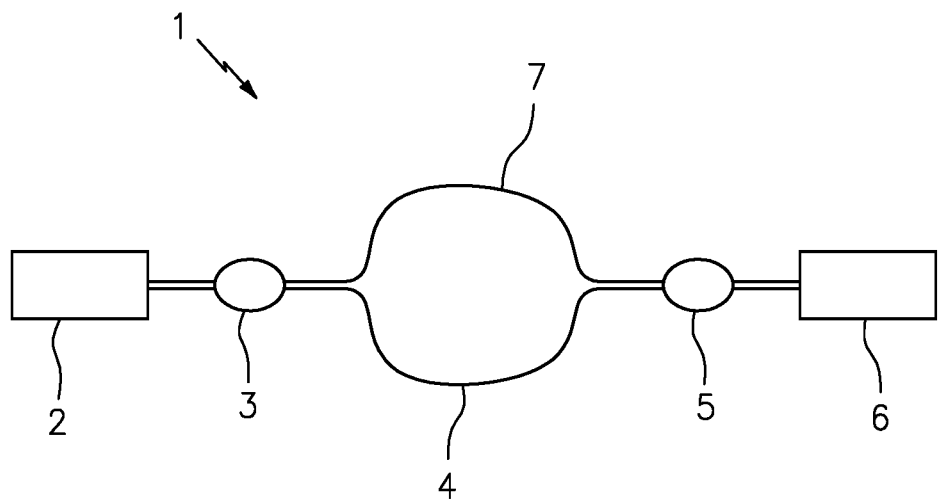
FIG. 1a is a schematic representation of a Mach-Zehnder interferometric system of the prior art.
Figure 1B:
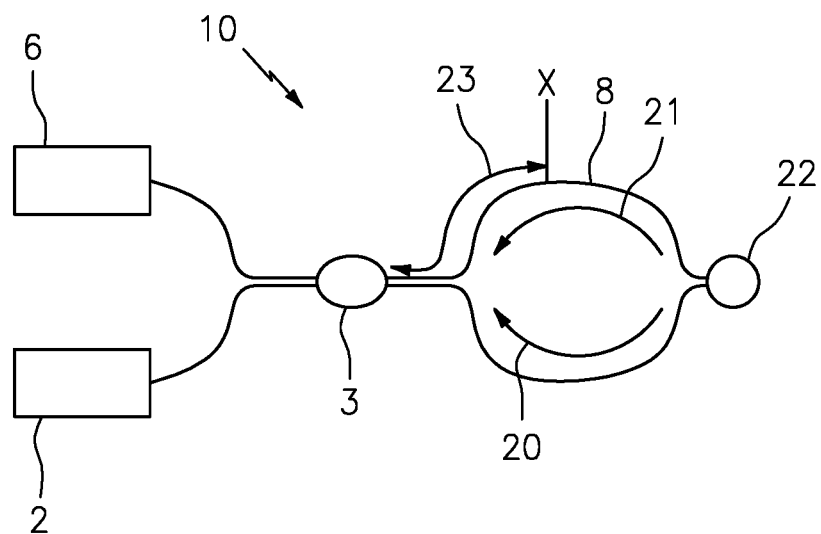
FIG. 1b is a schematic representation of a Sagnac ring interferometric system of the prior art.
Figure 1C:
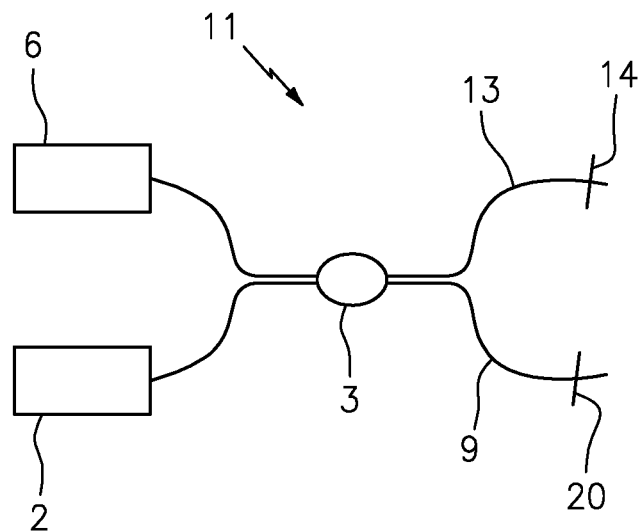
FIG. 1c is a schematic representation of a Michelson interferometric system of the prior art.
Figure 1D:
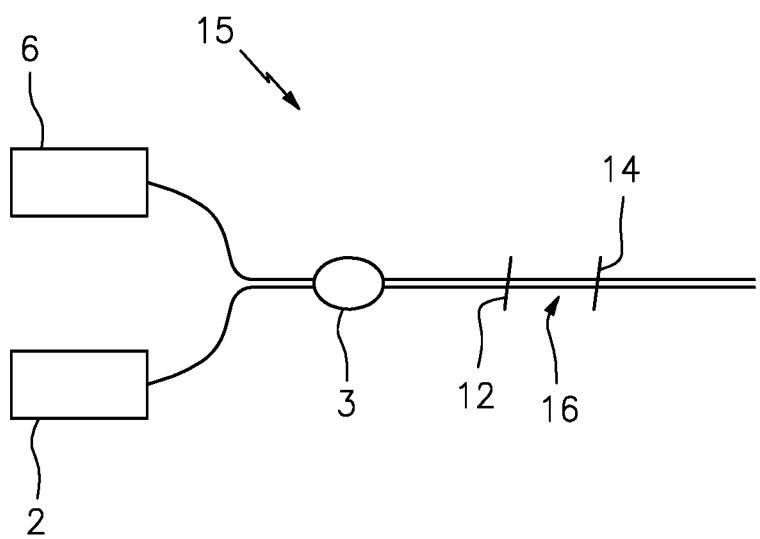
FIG. 1d is a schematic representation of a Fabry-Perot interferometric system of the prior art.

Now referring back to FIG. 1b, and as an example of single SRI disturbance detection system 10 of the prior art, a physical disturbance is encountered by the fiber at point X at an optical path length distance 23 equal to $L_1$ along the fiber of loop 8 having a total length of L. The physical disturbance causes a perturbation in the core of the fiber in the form of an effective change in the optical path length of loop 8. As described herein above, light counterpropagating in loop 8 will encounter the disturbance at point X having a location of $L_1$. The effective change in path length of loop 8 will cause a phase change between light travelling in the clockwise direction 20 and light travelling in the counter-clockwise direction 21 when the counterpropagating signals are combined at optical coupler 3 to produce a combined light signal. The fiber of loop 8 can be comprised of SMF and it is known that SMF has a constant refractive index of approximately 1.47 (at the wavelengths of interest) and since the light propagates in the same medium, it travels at the same speed in both directions. The speed of the propagating light is known to be governed by the relationship of the speed of light in a vacuum to the medium is propagating in:

$$v \cong c/n \cong 2.99 \times 10^8 \text{ m/s}/1.47 \approx 2 \times 10^8 \text{ m/s} \quad \text{(Equation 1)}$$

Assuming the length of loop 8 is known as described herein above as equal to L, and the velocity of the light is known, the raw intensity of the signal $I_o$ received at detector 6 is dependent on the interference between the phase angles $\Delta\theta_s$ of the counterpropagating light in accordance with the following relationship:

$$Io = I(A + B \cos(\Delta\theta_s)) \quad \text{(Equation 2)}$$

wherein I is the intensity of the light travelling in the counter-clockwise direction 21 and the clockwise direction 20, or simply the total optical power available, A and B are constants related to transmission losses, differential losses in optical coupler 3, etc., and $\Delta\theta_s$ is the phase difference between the light travelling in the counter-clockwise direction 21 and that travelling in the clockwise direction 20.

In this example of a single Sagnac ring interferometer system 10, and for a special case where it is assumed that the disturbance that occurs at point X and it is comprised of a single frequency that is purely sinusoidal in form and otherwise does not vary with time, the disturbance function $\Psi(t)$ can be expressed as:

$$\Psi(t) = \emptyset_s \cdot \sin(\omega_s \cdot t) \quad \text{(Equation 3)}$$

wherein $\emptyset_s$ is the amplitude of the disturbance and $\omega_s$ is the angular frequency of the disturbance and wherein $\omega_s = 2\pi f_s$ and $f_s$ is the frequency of the disturbance, for example, expressed in kHz.

The disturbance $\Psi(t)$ will modulate the phase of the light waves travelling in the counter-clockwise direction 21 and the clockwise direction 20 in accordance with its frequency. The interference between the phase angles $\Delta\theta_s$ in Equation 2 will be:

$$\Delta\theta_s = \emptyset_s \cdot \sin\left(\omega_s \cdot \left(t - \frac{L_1}{v}\right)\right) - \emptyset_s \cdot \sin\left(\omega_s \cdot \left(t - \frac{L - L_1}{v}\right)\right) \quad \text{(Equation 4)}$$

wherein L is total optical path length of loop 8, $L_1$ is the optical path length 23 at point X (position of the disturbance) and t is the time at which the disturbance begins. Equation 4 reduces to:

$$\Delta\theta_s = 2\emptyset_s \cdot \sin\left(\omega_s\left(\frac{L - 2L_1}{v}\right)\right) \cdot \cos\left(\omega_s \cdot \left(t - \frac{L}{2v}\right)\right) \quad \text{(Equation 5)}$$

The detector 6 of single SRI disturbance detection system 10 detects the optical intensity $I_o$ of the interfering light waves of Equation 2. It is a known problem in the prior art that in a single SRI disturbance detection system 10 the occurrence of a disturbance is detected but the solution to Equation 5 is indeterminate and the position of the disturbance X at $L_1$ is cannot be found.

In Equation 5, the first portion of the right-hand side is the amplitude term $\Delta\theta_{amp}$ of the signal and the second portion of the right-hand side represents the oscillatory term of the signal. Just looking at the amplitude term:

$$\Delta\theta_{amp} = 2\emptyset_s \cdot \sin\left(\omega_s\left(\frac{L - 2L_1}{v}\right)\right) \quad \text{(Equation 6)}$$

because v is very large and in the denominator, the sine of that term will be very small and its approximation can be rewritten as:

$$\Delta\theta_{amp} \approx 2\emptyset_s \cdot \left[\omega_s\left(\frac{L - 2L_1}{v}\right)\right] \quad \text{(Equation 7)}$$

Now referring to FIG. 2, and as described herein above, disturbance detection system 40 is comprised of $SRI_A$ and $SRI_B$ that both share the same sensing arm 45, which includes the optical path length 61 equal to $L_1$ where a disturbance occurs, and wherein $SRI_A$ and $SRI_B$ have total path lengths $L_A$ and $L_B$ respectively. Inventively, and as will be described in more detail immediately below, disturbance detection system 40 provides a solution for the position of a disturbance along the shared sensing arm 45. Following the same example herein above where the disturbance function $\Psi(t)$ associated with a disturbance at point X comprises a single frequency that is purely sinusoidal in form and otherwise does not vary with time, and in accordance with the present disclosure, the raw intensity signal $I_{OA}$ detected at detector 57 for $SRI_A$ is given by Equation 2 as:

$$I_{OA} = I_A(A_A + B_A \cos(\Delta\theta_A)) \quad \text{(Equation 8)}$$

wherein $I_A$ is the intensity of the source light in $L_A$, $A_A$ is a first constant related to a transmission loss in $L_A$, $B_A$ is a second constant related to a transmission loss in $L_A$. The raw intensity signal $I_{OB}$ detected at detector 56 for $SRI_B$ is given by Equation 2 as:

$$I_{OB} = I_B(A_B + B_B \cos(\Delta\theta_B)) \quad \text{(Equation 9)}$$

wherein $I_B$ is the intensity of the source light in $L_B$, $A_B$ is a first constant related to a transmission loss in $L_B$, $B_B$ is a second constant related to a transmission loss in $L_B$ and wherein $\Delta\theta_A$ and $\Delta\theta_B$ are the phase differences for $SRI_A$ and $SRI_B$ respectively and are recovered using Equations 4-6 described herein above. Namely the amplitude term from Equation 7 for $SRI_A$ becomes:

$$\Delta\theta_{ampA} = 2\emptyset_s \cdot \left[\omega_s\left(\frac{L_A - 2L_1}{v}\right)\right] \quad \text{(Equation 10)}$$

and the amplitude term from Equation 7 for $SRI_B$ becomes:

$$\Delta\theta_{ampB} = 2\emptyset_s \cdot \left[\omega_s\left(\frac{L_B - 2L_1}{v}\right)\right] \quad \text{(Equation 11)}$$

Then, using the phase differences $\Delta\theta_A$, $\Delta\theta_B$ recovered from the raw signals $I_{OA}$, $I_{OB}$ measured at detectors 57, 56 respectively, and dividing Equation 10 by Equation 11 we arrive at the equality:

$$\frac{L_A - 2L_1}{L_B - 2L_1} = \frac{\Delta\theta_{ampA}}{\Delta\theta_{ampB}} \quad \text{(Equation 12)}$$

Because the length of the optical light path of $SRI_A$, $L_A$, and the length of the optical light path of $SRI_B$, $L_B$, are known, solving Equation 12 for $L_1$ yields the location of the disturbance at point X along sensing arm 45. For instance, and as a non-limiting example, if the relationship between the optical path lengths of $SRI_A$ and $SRI_B$ were chosen to be $L_A = 2L_B$, the location of the disturbance $L_1$ becomes:

$$L_1 = L_B \left[ \frac{2 - (\Delta\theta_A / \Delta\theta_B)}{2 - 2 \cdot (\Delta\theta_A / \Delta\theta_B)} \right] \quad \text{(Equation 13)}$$

In embodiments of the present disclosure where the disturbance function $\Psi(t)$ is not purely sinusoidal in form as described herein above with reference to Equation 2, the disturbance function can be a time varying function of the physical disturbance and can take on a more generalized form. Such generalized form can be expressed as follows:

$$\Delta\theta = \left[ \frac{d\Psi(t)}{dt} \cdot \left( \frac{L - 2L_1}{v} \right) \right] \quad \text{(Equation 14)}$$

By measuring the raw optical signals $I_{OA}/I_{OB}$ from $SRI_A$ and $SRI_B$ and demodulating the signals to recover $\Delta\theta_A, \Delta\theta_B$ as described herein above, embodiments of the present disclosure again use the relationship of $\Delta\theta_A, \Delta\theta_B$ in Equation 12 to determine the location $L_1$ of the disturbance at point X along sensing arm 45.

In addition to being able to accurately resolve the POD, embodiments of the present disclosure include the ability to provide accurate information on the magnitude of a disturbance. For instance, using embodiments of the present disclosure, once the position of the disturbance $L_1$ is determined, the amplitude of the disturbance $\phi_s$ can be determined. In addition, the angular frequency $\omega_s$ of the disturbance can also be determined. Detectors 56, 57 can also include electronic instrumentation, processors and memory storage (including non-volatile memory) to process the converted optical signals.

Figure 4:
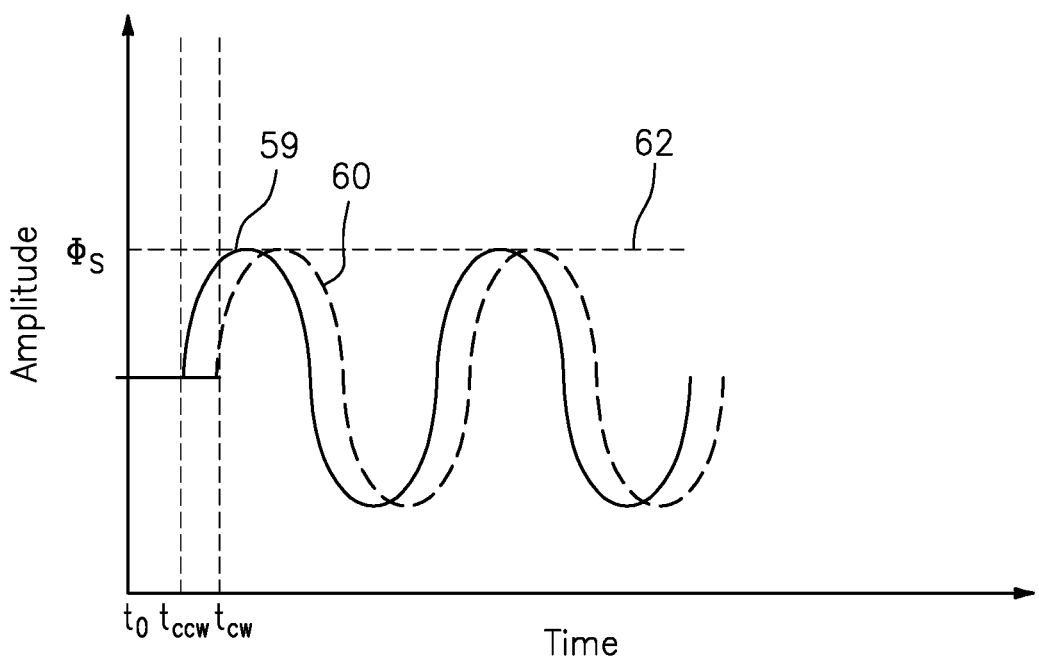
FIG. 4 is a graphical representation of the output signals of a double ring SRI sensing system in accordance with certain embodiments of the present disclosure.

Now with reference to FIG. 4, there is shown a graphical representation of the amplitudes for a disturbance at position X described above as the light travelling in the counter-clockwise direction 59 and the light travelling in the clockwise direction 60 just before arriving at optical coupler 44. Note that the signals have been normalized with respect to any dc offset caused by birefringence as described herein above. This is merely a representation and, as it will be disclosed herein after, it is valid for both $SRI_A$ and $SRI_B$. At time $t_o$ a disturbance event occurs at position X on sensing arm 45. After the event begins at $t_o$ the light travelling in the counter-clockwise direction 59 travels the distance $L_1$ and reaches the optical coupler 44 arriving at $t_{counter-clockwise}$. The light travelling in the clockwise direction 60 travels through the remainder of the optical path of either $SRI_A$ and $SRI_B$ respectively and arrives at optical coupler 44 at tow with the time delay associated with the length of the optical path either $L_A - L_1$ or $L_B - L_1$ and can be as short as a few microseconds. It should be appreciated that the interference of the light travelling in the counter-clockwise direction 59 with that of the light travelling in the clockwise direction 60 will produce a modulated signal at the detectors representative of the interference shown in the figure. The maximum amplitude of the disturbance $\phi_s$ is shown as line 62.

In operation, disturbance detection system 40 is suitably installed to detect predetermined or undetermined disturbances. In certain embodiments of the present disclosure, sensing arm 45 can be mounted to, or embedded in, objects (such as walls, doors, fences, pipelines or the like) or substances (such as the ground, or fluids, composite materials) wherein the objects or substances are normally at rest with respect to earth. As discussed herein above, non-sensing arm 46 and signal arms 48, 51 are positioned to be isolated from disturbances. Advantageously, the intensity of the disturbance and location of the disturbance along sensing arm 45, as well as other information about the disturbance can be determined using the dual SRI of the present disclosure.

Embodiments of the present disclosure can provide other information about a disturbance in addition to information relating to the occurrence, location and intensity of a disturbance as described herein above. For instance, the various sources of disturbances can each provide a unique "signature" in terms of frequency and amplitude. A disturbance will produce frequency content that will modulate the phase of the signals that is detectable by the electrical instrumentation. As an example, a human producing footsteps will produce a signature that is distinct from other disturbances. Software within the electrical instrumentation can include a database of such signatures to help identify the cause of the disturbance. The ability of the software to identify unknown sources of disturbances can be aided by human input of a source associated with a source as well as artificial intelligence means to populate the database.

While the foregoing is directed to embodiments of the present disclosure, other and further embodiments of the disclosure may be devised without departing from the basic scope thereof, and the scope thereof is determined by the claims that follow.

What is claimed is:

1. An apparatus for sensing a physical disturbance, comprising:
   a light source adapted to produce a source light;
   a first interferometer coupled to the light source having a first optical path length comprising a sensing arm and a first reflector adapted to produce a first reflected light;
   a second interferometer coupled to the light source having a second optical path length comprising the sensing arm and a second reflector adapted to produce a second reflected light;
   at least one detector coupled to the first interferometer and the second interferometer and configured to detect a first phase shift in the first reflected light and to detect a second phase shift in the second reflected light;
   wherein the sensing arm comprises an optical fiber having a sensing optical path adapted to sense the physical disturbance at a position along the sensing optical path and wherein the physical disturbance produces the first phase shift and the second phase shift;
   wherein the source light and the first reflected light travel in a first direction and a second direction along the first optical path length and wherein the source light and the second reflected light travel in a third direction and a fourth direction along second optical path length;
   a processor with logic to determine a parameter of the physical disturbance from the first phase shift and the second phase shift;

wherein the parameter includes at least one of the position of the physical disturbance, a magnitude of the physical disturbance, or a frequency of the physical disturbance; and wherein the processor includes logic to demodulate the first phase shift and the second phase shift; wherein the at least one detector detects a raw intensity of the first reflected light equal to the following equation:

$$I_{OA}=I_A(A_A+B_A \cos(\Delta\theta_A))$$

wherein $I_{OA}$ is the raw intensity of the first reflected light, $I_A$ is an intensity of the source light in the first optical path length, $A_A$ is a first constant related to a transmission loss in the first optical path length, $B_A$ is a second constant related to a transmission loss in the first optical path length and $\Delta\theta_A$ is the first phase shift; and wherein the at least one detector detects a raw intensity of the second reflected light equal to the following equation:

$$I_{OB}=I_B(A_B+B_B \cos(\Delta\theta_B))$$

wherein $I_{OB}$ is the raw intensity of the second reflected light, $I_B$ is an intensity of the source light in the second optical path length, $A_B$ is a first constant related to a transmission loss in the second optical path length, $B_B$ is a second constant related to a transmission loss in the second optical path length and $\Delta\theta_B$ is the second phase shift.

2. The apparatus of claim 1 wherein the processor further includes logic to determine the first phase shift in accordance with the following equation:

$$\Delta\theta_A = \left[\frac{d\Psi(t)}{dt} \cdot \left(\frac{\Delta L_A - 2L_1}{v}\right)\right]$$

wherein $\Psi(t)$ is a time varying function of the physical disturbance, $L_A$ is the first optical path length, $L_1$ is the position of the physical disturbance along the sensing optical path and v is a speed of the first reflected light; and wherein the processor includes logic to determine the second phase shift in accordance with the following equation:

$$\Delta\theta_B = \left[\frac{d\Psi(t)}{dt} \cdot \left(\frac{\Delta L_B - 2L_1}{v}\right)\right]$$

wherein $\Psi(t)$ is the time varying function of the physical disturbance, $L_B$ is the second optical path length, $L_1$ is the position of the physical disturbance along the sensing optical path and v is a speed of the second reflected light.

3. The apparatus of claim 2 wherein the processor further includes logic to resolve the position of the physical disturbance along the sensing optical path in accordance with the following equation:

$$L_1 = \frac{L_A \cdot \Delta\theta_{ampB} - L_B \cdot \Delta\theta_{ampA}}{2\Delta\theta_{ampB} - 2\Delta\theta_{ampA}}$$

wherein $\Delta\theta_{ampA}$ is an amplitude of the first reflected light and $\Delta\theta_{ampB}$ is an amplitude of the second reflected light.

4. The apparatus of claim 1 wherein the first reflector is a FBG adapted to produce the first reflected light at a characteristic wavelength of 1545 nm and the second reflector is a FBG adapted to produce the second reflected light at a characteristic wavelength of 1552 nm.

5. The apparatus of claim 4 wherein the at least one detector comprises a first detector and a second detector, the apparatus further comprising an optical circulator configured to receive the first reflected light and the second reflected light and to couple the first reflected light to the first detector and to couple the second reflected light to the second detector.

* * * * *